United States Patent [19]

Schmidt et al.

[11] 4,443,591

[45] Apr. 17, 1984

[54] METHOD FOR MAKING POLYETHERIMIDE

[75] Inventors: Lawrence R. Schmidt, Schenectady; Eric M. Lovgren, Westerlo, both of N.Y.

[73] Assignee: General Electric Company, Schenectady, N.Y.

[21] Appl. No.: 459,849

[22] Filed: Jan. 21, 1983

[51] Int. Cl.$^3$ .............................................. C08G 73/10
[52] U.S. Cl. .................................... 528/128; 264/349; 526/65; 526/66; 528/26; 528/28; 528/125; 528/126; 528/173; 528/179; 528/185; 528/188; 528/351; 528/352; 528/353
[58] Field of Search .................... 526/65, 66; 264/349; 528/26, 28, 125, 126, 128, 173, 179, 185, 188, 351–353

[56] References Cited

U.S. PATENT DOCUMENTS 4,011,198   3/1977   Takekoshi et al. .................. 528/28
4,073,773   2/1978   Banucci et al. ..................... 528/211

*Primary Examiner*—Lester L. Lee
*Attorney, Agent, or Firm*—William A. Teoli; James C. Davis, Jr.; James Magee, Jr.

[57] ABSTRACT

Polyetherimides are formed by the dry blending of organodianhydride, organic diamine, and chain stopper and the polymerization of the dry-blended mixture in a continuous, steady state reaction, employing an extruder reactor as the reaction chamber. The extruder reactor is provided with means for heating and cooling, evacuation of water of reaction, and material conveyance means in order to achieve a steady state necessary for continuous production of a uniform polymeric product.

25 Claims, 2 Drawing Figures

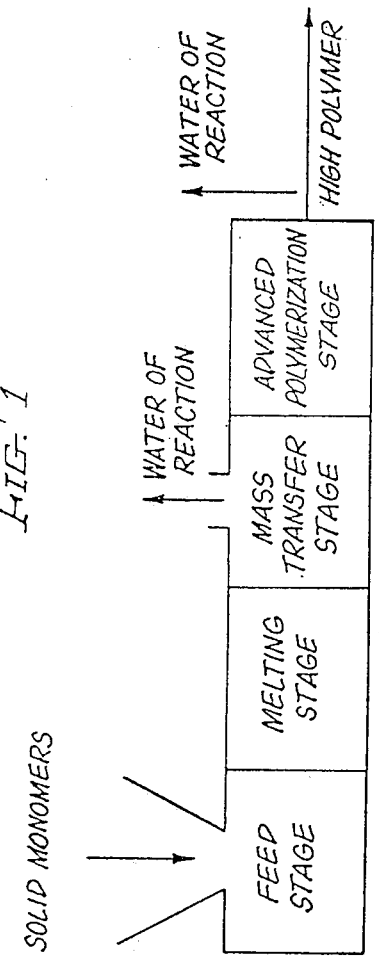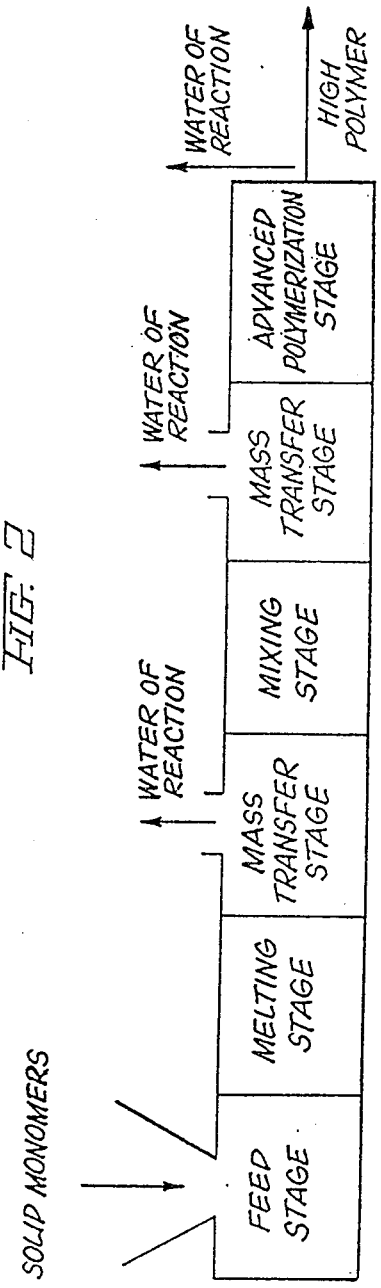

METHOD FOR MAKING POLYETHERIMIDE

CROSS REFERENCE TO RELATED APPLICATIONS

Reference is made to our copending application Ser. No. 459,851 for Apparatus Used in Monomer Polymerization and copending application Ser. No. 459,850 of Lawrence R. Schmidt, Eric M. Lovgren and Peter G. Meissner for Polymerization Process, where all of the aforementioned applications are filed concurrently herewith, incorporated herein by reference and assigned to the same assignee as the present invention.

BACKGROUND OF THE INVENTION

The present invention relates to a continuous method for making polyetherimide, based on the melt polymerization of an aromatic bis(ether anhydride) and an organic diamine utilizing an extruder reactor.

Prior to the present invention, as shown in Takekoshi et al, U.S. Pat. No. 4,011,198, incorporated herein by reference and assigned to the same assignee as the present invention, there is provided a method for making polyetherimides by effecting reaction at melt polymerization temperatures between an aromatic bis(ether anhydride), or "organic dianhydride" and an organic diamine in an extruder. The organic dianhydride has the formula,

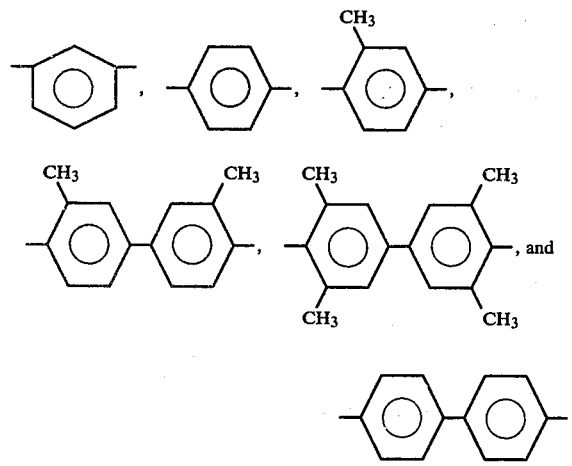

and the organic diamine has the formula, $$H_2N-R^1-NH_2, \qquad (2)$$

where R is a member selected from

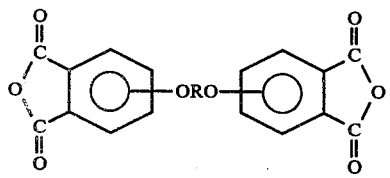

and divalent organic radicals of the general formula,

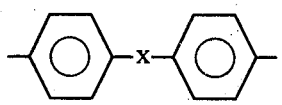

X is a member selected from the class consisting of divalent radicals of the formula,

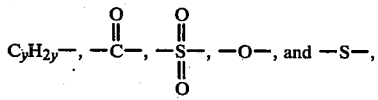

y is an integer from 1 to 5; and $R^1$ is a divalent organic radical selected from the class consisting of aromatic hydrocarbon radicals having from 6 to about 20 carbon atoms and halogenated derivatives thereof, alkylene radicals having from 2 to about 20 carbon atoms, cycloalkylene radicals having from 3 to about 20 carbon atoms, from $C_2$ to about $C_8$ alkylene terminated polydiorganosiloxanes and divalent radicals of the general formula,

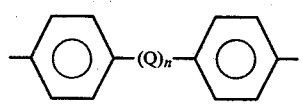

Q is a member selected from the class consisting of

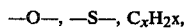

x is an integer from 1 to 5 and n is 0 or 1.

Further improvements in the melt polymerization of mixtures of organic dianhydride of formula (1) and organic diamine of formula (2) to make polyetherimide are shown by Banucci et al U.S. Pat. No. 4,073,773, incorporated herein by reference and assigned to the same assignee as the present invention. Banucci et al show the introduction of a powdered mixture of organic diamine and aromatic bis(ether anhydride) into an inlet opening of a screw extruder. The powdered mixture of organic diamine and aromatic bis(ether anhydride) were blended in certain proportions and attempts were made to maintain the powdered mixture as uniform as possible. The preformed powdered blend was passed through a first extruder zone maintained at a low temperature to a zone where the mixture was melted and water of reaction was removed.

Although the methods of Takekoshi et al and Banucci et al provide procedures for making polyetherimide in an extruder by melt polymerization of a mixture of organic dianhydride of formula (1) and organic diamine of formula (2), steady state conditions required for continuous production of polyetherimide by melt polymerization are often difficult to achieve. The temperature profile of monomer solids initially fed into the extruder have to be carefully monitored prior to the venting of water of reaction to avoid plugging of the monomer feed in the extruder. The conversion of the solid monomers to the molten state can occur in Banucci et al at the mass transfer stage where water is evacuated. This procedure can interefere with the creation of steady state conditions in the extruder and optimum polymerization conditions for making polyetherimide.

A significant feature of the present invention is based on the discovery that steady state conditions in polyetherimide formation can be achieved by introducing a mixture of organic dianhydride of formula (1) and organic diamine of formula (2) into an extruder reactor and thereafter rapidly converting the monomer solids to the liquid state by internal viscous heating. Viscous heating is a frictional heating resulting from intermolecular contact between molecules under a high rate of shear. For example, mechanical kneading of material can be used. The resulting liquid feed mixture is thereafter conveyed to a mass transfer stage resulting in the elimination of water of reaction, followed by an advanced polymerization stage. Conversion of the dry-blended feed mixture to the liquid state is achieved by viscous heating at a temperature in the range of from about 50° C. to 350° C. resulting from the mechanically working of the material during conveyance. Mass transfer of water of reaction is enhanced at the elevated temperature resulting from the viscous heating. The resulting melt pool is thereafter subjected to high shear and intensive mixing at temperatures in the range of from about 250°–400° C. and at elevated pressure. To improve the polymerization rate, there optionally can be included one or more additional mass transfer stages.

STATEMENT OF THE INVENTION

There is provided a process for making polyetherimide in a continuous manner consisting essentially of chemically combined units of the formula,

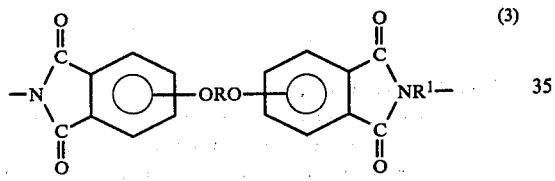
(3)

comprising
(1) dry-blending aromatic bis(ether anhydride) and organic diamine,
(2) feeding the resulting dry-blended mixture to the feed throat of an extruder reactor,
(3) conveying the feed solids to a melting stage, where the solids are rapidly converted to the liquid state by being subjected to viscous heating at a temperature in the range of from about 50° C. to about 350° C.,
(4) conveying said liquid to a mass transfer stage where water of reaction is separated from the surface of the partially polymerized polyetherimide melt,
(5) thereafter conveying the resulting melt to high shear and intensive mixing at a temperature in the range of from 250° C. to 400° C. and a pressure of from 1 to 3 atmospheres, and
(6) separating high molecular weight polyetherimide therefrom along with the removal of final water of reaction.
where R and $R^1$ are as previously defined.

In addition to the organic anhydride of formula (1), the organic anhydrides utilized in the practice of the present invention also can included mixtures of aromatic bis(ether anhydride) of formula (1) and up to 30 mole percent of benzophenone dianhydride.

Included by the organic dianhydrides of formula (1) are compounds such as

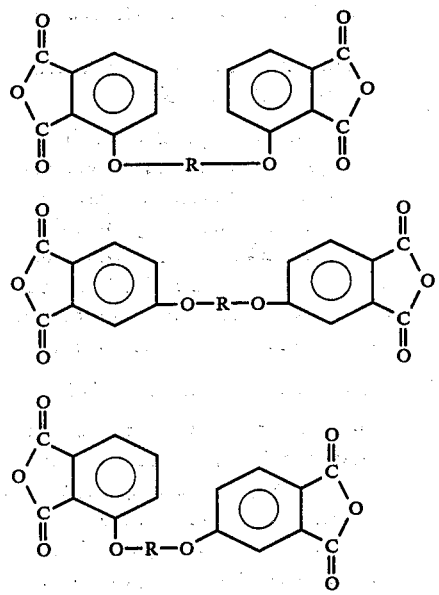

where R is defined above. A preferred form of R is

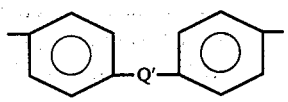

where Q' is selected from

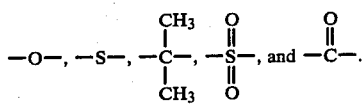

Aromatic bis(ether anhydride)s of formula (1) include for example, 2,2-bis[4-(2,3-dicarboxyphenoxy)phenyl]propane dianhydride;
4,4'-bis(2,3-dicarboxyphenoxy)diphenyl ether dianhydride;
1,3-bis(2,3-dicarboxyphenoxy)benzene dianhydride;
4,4'-bis(2,3-dicarboxyphenoxy)diphenyl sulfide dianhydride;
1,4-bis(2,3-dicarboxyphenoxy)benzene dianhydride
4,4'-bis(2,3-dicarboxyphenoxy)benzophenone dianhydride;
4,4'-bis(2,3-dicarboxyphenoxy)diphenyl sulfone dianhydride
2,2-bis[4-(3,4-dicarboxyphenoxy)phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
1,3-bis(3,4-dicarboxyphenoxy)benzene dianhydride;
1,4-bis(3,4-dicarboxyphenoxy)benzene dianhydride;
4,4'-bis(3,4-dicarboxyphenoxy)benzophenone dianhydride;
4-(2,3-dicarboxyphenoxy)-4'-(3,4-dicarboxyphenoxy)-diphenyl-2,2-propane dianhydride, etc., and mixtures of such bisether anhydrides Additional aromatic bis(ether anhydride)s also included by formula(1) are shown by M. M. Koton, F. S. Florinski, M. I. Bessonov, A. P. Rudakov (Institute of Heteroorganic Compounds, Academy of Sciences USSR) USSR 257,010, Nov. 11, 1969, Appl. May 3, 1967, and M. M. Koton, F. S. Florinski, Zh. Org. Khin 4(5) 774 (1968).

Bis(etheranhydride)s preferred herein are: 2,2-bis[4-(2,3-dicarboxyphenoxy)phenyl]propane dianhydride; 2,2-bis[4-(3,4-dicarboxyphenoxy)phenyl]propane dianhydride; 4-(2,3-dicarboxyphenoxy)-4'-(3,4-dicarboxyphenoxy)diphenyl-2,2-propane dianhydride and mixtures thereof.

Some of the aromatic bis(etheranhydride) compounds of formula (1) are shown in U.S. Pat. No. 3,972,902 (Heath and Wirth).

Included by the organic diamines of formula (3) are for example,
m-phenylenediamine;
p-phenylenediamine;
4,4'-diaminodiphenylpropane;
4,4'-diaminodiphenylmethane (4,4'-methylenedianiline);
benzidine;
4,4'-diaminodiphenyl sulfide;
4,4'-diaminodiphenyl sulfone;
4,4'-diaminodiphenyl ether (4,4'-oxydianiline);
1,5-diaminonaphthalene;
3,3'dimethylbenzidine;
3,3'-dimethoxybenzidine;
2,4-bis(-amino-t-butyl)toluene;
bis(p--amino-t-butylphenyl)ether;
bis(p--methyl-o-aminopentyl)benzene;
1,3-diamino-4-isopropylbenzene;
1,2-bis(3-aminopropoxy)ethane;
m-xylylenediamine;
p-xylylenediamine;
2,4-diaminotoluene;
2,6-diaminotoluene;
bis(4-aminocyclohexyl)methane;
3-methylhaptamethylenediamine;
4,4-dimethylhaptamethylenediamine;
2,11-dodecanediamine;
2,2-dimethylropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methlnonamethylenediamine;
1,4-cyclohexanediamine;
1,12-octadecanediamine;
bis(3-aminopropyl)sulfide;
N-methyl-bis(3-aminopropyl)amine;
hexamethylenediamine;
heptamethylenediamine;
nonamethylenediamine;
decamethylenediamine;
bis(3-aminopropyl)tetramethyldisiloxane;
bis(4-aminobutyl)tetramethyldisiloxane, etc., and mixtures of such diamines.

Organic diamines preferred herein are m-phenylenediamine; 4,4'-oxydianline 4,4'-methylenedianiline; and mixtures thereof.

The polyetherimides made in accordance with the practice of the present invention consist essentially of chemically combined units of formula (3). These polymers can be blended with various fillers, such as silica fillers, glass fibers, carbon whiskers, perlite, etc. The resulting filled compositions can have a proportion of from 1 part to 70 part of filler per hundred part of polyetherimide.

In accordance with the practice of the present invention, solid powdered monomers for the formation of polyetherimide are dry blended together. In order to achieve optimum molecular weight control, a chain stopper can be utilized. Preferably, the chain-stopper can be dispersed as a solid. The monomers can be intimately mixed in the proper proportions. There can be utilized organic dianhydrides of formula (1) and organic diamines of formula (2). Because of the desirability of employing a solid chain-stopper, the chain-stopper of choice in accordance with the present invention can include various aromatic anhydrides such as phthalic anhydride. Other chain stoppers can include aromatic or aliphatic amines.

After the solid monomers and chain-stopper are adequately dry blended, they are fed to an extruder reactor in accordance with the present invention. The extruder reactor is specifically designed to provide for melting and reaction, and removal of appropriate quantities of water of reaction at appropriate times. The intrinsic viscosity of the polyetherimide polymers produced in accordance with the present invention are preferably in the range of 0.40 dl/g in chloroform, generally from about 0.30 to 0.50 dl/g and the engineering properties of the materials thus produced are excellent. However, in particular instances, depending upon the particular applications desired, for example, coating applications, etc., polyetherimide can be made having intrinsic viscosities as low as 0.1 or less. Appropriate amounts of chain stoppers, based on the total moles of organic dianhydride in the dry mixture, can be used in accordance with the standard practice.

Preferably, the extruder reactor of the present invention includes six stages; a feed stage, a melting stage, a first mass transfer stage, a mixing stage, a second mass transfer stage, and an advanced polymerization stage. The screw elements in each of these stages is specifically selected to provide for polymerization of the monomeric materials in a continuous steady state manner, i.e., an engineering, steady state where all variables at any particular point in the extruder reactor remain fixed in time.

Processing of materials in a continuous manner is always possible. However, until the specific reaction kinetics and thermodynamics are understood and accommodated for, steady state is not achieved. The integration of the various factors important in the polymerization of polymeric polyetherimides is achieved in accordance with the present invention by the proper selection and sequencing of reaction conditions in the various stages of the extrusion polymerization process. In the feed stage of the extrusion polymerizer, the solids are received and conveyed to a melting stage. There is a sharp solid-liquid transition region in this melting stage achieved through use of viscous heating. Viscous heating involves the internal heat generated by the friction of the molecules rubbing against each other and is caused by the proper selection of screw elements, e.g., kneading blocks, in the melting stage.

From the melting stage, the now molten and partially reacted monomers are conveyed to a first mass transfer stage where there is a melt pool acceleration to generate surface area to enhance mass transfer and from 40 to 60% of the water of reaction is removed. The temperature is maintained or slightly increased in this first mass transfer stage.

From the first mass transfer stage, the material is conveyed to a mixing stage where there is a melt pool deceleration under high shear. Again, there are zero and forward conveying kneading block an the temperature is, again, maintained or increased slightly from the first mass transfer stage.

The now further reacted polyetherimide is conveyed from this mixing stage to a second mass transfer stage where there is, again, a melt pool acceleration and removal of additional water of reaction, in this case from 30 to 45% of the ultimate water to be produced. The temperature is generally maintained, here, at the level achieved in the mixing stage.

The partially polymerized polyetherimide is conveyed from the second mass transfer stage to an advanced polymerization stage where polymerization is completed and, upon exiting of the polymer from the extruder, the final water of reaction, from 10 to 15% of that generated is removed.

The melt pool acceleration is necessary in the two mass transfer stages to increase the surface area of the polymer and aid in driving off the water of reaction. If the water is not removed, the reaction is inhibited. The succession of melt pool acceleration, melt pool deceleration, and second melt pool acceleration is critical. The amount of water removed, particularly at the two mass transfer stages, must be in an integrated, balanced proportion.

The generated interfacial area in each of the mass transfer stages can be determined by idealizing each of the intermeshing scews of a twin screw extruder, each chamber, for example, having a diameter 28 mm. Under these conditions, with the barrel lengths employed effective interfacial areas can be obtained. The accuracy of the idealization can be confirmed by observation of the state of the polymer on the screws when those screws can be extracted immediately after a run is terminated.

The novel screw configuration of the extruder employed for polymerization in accordance with the present invention is particularly critical in the melting stage. The organic dianhydride and organic diamine have sharply differing melting points. For example, bisphenol-A dianhydride melts at approximately 190° C., while m-phenylenediamine melts at approximately 60° C. If these were permitted to melt in their normal manner, i.e., the diamine melting first, steady state reaction of the type achieved would be impossible. However, by so designing the extruder in the melting stage as to provide optimum viscous heating, and essentially simultaneous melting of the monomers, steady state operation is made possible.

The melting stage provides a sharp melting transition preserving the monomers in the proper stoichiometric ratio in the liquid state. This condition aids significantly in achieving an engineering steady state. The sharp transition between solid and melt in this stage can be confirmed when the extruder screws are pulled immediately after completion of a polymerization run. A sharp solid-liquid transition can be observed in the first kneading block section of the melting stage. A secondary benefit of the sharp melting transition is that the screw RPM is very steady, a contributing factor to steady state operation.

BRIEF DESCRIPTION OF THE DRAWINGS

In the accompanying drawings, an integrated stage extruder reactor for use in accordance with the process of the present invention is schematically illustrated.

More particularly, there is shown a continuous extruder reactor having a feed stage, a melting stage, a mass transfer stage and an advanced polymerization stage.

In FIG. 2, there is schematically illustrated the practice of the preferred form of the invention employing an extruder having a feed stage, a melting stage, a mass transfer stage, a mixing stage, a second mass transfer stage and an advanced polymerization stage. Those skilled in the art would know that if desired additional mixing stages and mass transfer stages can be used prior to the advanced polymerization stage.

In accordance with the preferred practice of the present invention, a Werner-Pfleiderer twin screw extruder, Model ZDS-K28 is employed. The flights or elements within the extruder are set up in accordance with the polymerization process of the present invention.

In the runs made in accordance with the present invention, a stoichiometric blend of bisphenol-A dianhydride and m-phenylene diamine monomers is mixed with three mole percent phthalic anhydride chain-stopper. The powders are dryblended in a Henschel mixer for 20 seconds at 1800 rpm and the resulting dry powder mix is fed at a constant rate to the extruder reactor of the present invention employing a weighbelt feeder.

This dry mix powder is added to the feed stage of the extruder reactor constructed in accordance with the present invention. In feed stage, the screw elements are of the solids conveying type, generally open pitch. The temperature in the feed stage is at approximately 25° to 50° C. and operation is essentially atmospheric pressure, as the feed stage is, in effect, vented to the atmosphere.

From the feed stage, the mixture of solids is conveyed to the melting stage of the extruder reactor. The screw elements, here are kneading blocks with zero pumping. Because of the selection of screw elements in the melting stage, there is viscous heating of the material with a sharp solid-liquid transition zone. Because of the viscous heating caused by the elements or blocks, the two monomers, though having widely divergent melting points, essentially melt simultaneously, so that the transition from solid to liquid is accomplished in less than 0.35 screw diameter.

The mixture of solids achieves a temperature of from 60° to 100° C. in this melting stage. The transition temperature, during which all of the solids in the mixture melt, is from 200° to 300° C., and the liquid temperature is from 180° to 300° C. Preferably, the liquid temperature is in the range of from 225° to 275° C. Because of the kneading blocks and zero pumping action, the pressure in the melting stage is increased to from about 1 to 5 atmospheres, preferably from 1 to 2 atmospheres.

From the melting stage, the now liquid, and partially polymerized, monomers are conveyed to a first mass transfer state. The elements or flights in the extruder in this first mass transfer stage are of the open pitch, forward conveying type. There is melt pool acceleration to achieve a generated interfacial area of from 25 to 35 in.$^2$/min. The temperature in this first mass transfer stage is maintained at from 180° to 400° C., preferably from 200° to 325° C. Because of the initial polymerization of the monomeric reactants, some water of reaction is generated which is vented. The amount of water vented at this stage of the reaction is from 50 to 60% of the water to be generated in the full polymerization. Because of the venting, the pressure in the first mass transfer stage is essentially atmospheric. If sufficient water is not vented, further polymerization is inhibited.

From the second mass transfer stage, the partially polymerized material is conveyed to an advanced polymerization state. The advanced polymerization stage is provided with tight pitch, forward conveying elements, and the outlet of the advanced polymerization stage is restricted, such as by a die. In this advanced polymerization stage, there is an extended residence time and intensive mixing to complete the polymerization of the polyetherimide. The temperature is maintained in the advanced polymerization stage at from 300° to 400° C., preferably from 325° to 400° C., and the pressure can range from 1 to 50 atmospheres, preferably from 1 to 25 atmospheres.

Upon leaving the advanced polymerization stage, the final high polymer is obtained, and the remaining water of reaction, from 10 to 15% of the total is removed. The reaction rate in the advanced polymerization stage is particularly temperature sensitive so that the higher the temperature, the less time is required in the advanced polymerization stage.

The extruder is preferably operated under starve-fed conditions, i.e., the flights are not completely filled with the powdered mixture.

A series of runs were made in an extruder reactor constructed in accordance with the polymerization process of the present invention. Various degrees of mixing, conveying and mass transport were effected by selectively varying the number and length of specialized screw elements to achieve the desired process conditions. Set forth below in Table 1 are the temperatures used with three different screw configurations.

TABLE I

| Extruder Barrel Zone* | Extruder Barrel Set Temperatures | | |
|---|---|---|---|
| | Screw Design | | |
| | #1 (°C.) | #2 (°C.) | #3 (°C.) |
| 1 | 100 | 100 | 100 |
| 2 | 220 | 240 | 240 |
| 3 | 320 | 370 | 370 |
| 4 | 320 | 370 | 370 |
| 5 | 320 | 370 | 370 |
| 6 | 350 | 370 | 370 |

*1 is the first heated zone beyond feed hopper and 6 is the heated die at the end of the extruder.

The extruder used in carrying out the runs of this invention was a Werner-Pfleiderer twin screw, co-rotating extruder with intermeshing screws. Each of the extruder chambers had a diameter of 28 mm. and the nominal length of the process stages was as shown below in Table 2, with the length being shown in mm, where process stages 1 to 6 are as defined in FIG. 2. The feed hopper and the vents were blanketed with argon gas prior to and during the entire run in each case.

TABLE II

| Process Function | Stage | Length (mm) |
|---|---|---|
| Feed | 1 | 105 |
| Melting | 2 | 135 |
| Mass Transfer | 3 | 135 |
| Mixing | 4 | 125 |
| Mass Transfer | 5 | 100 |
| Advanced Polymerization | 6 | 150 |

Employing the screw designs with barrel set temperatures set forth in Table I, a series of runs were made employing bisphenol-A dianhydride and m-phenylenediamine in stoichiometric ratios, with 3% phthalic anhydride added as an end cap to obtain the results shown below in Table 3 which indicates the example number, screw design employed, screw speed in rpm, run time in hours, feed rate in pounds per hour, and maximum intrinsic viscosity in chloroform, measured in dl/g:

TABLE III

| Example No. | Screw Design No. | Screw Speed (rpm) | Run Time (Hr.) | Rate (Lbs./Hr) | Maximum IV (dl/g) |
|---|---|---|---|---|---|
| 1 | 1 | 250 | 2.5 | 0.5 | 0.34 |
| 2 | 1 | 250 | 3 | 0.5 | 0.39 |
| 3 | 2 | 250 | 4.5 | 0.5 | 0.40 |
| 4 | 3 | 200 | 2.5 | 0.5 | 0.21 |
| 5 | 3 | 200 | 2.0 | 0.5 | 0.42 |
| 6 | 3 | 200 | 3.5 | 0.5 | 0.44 |
| 7 | 3 | 200 | >5 | 0.5 | 0.44 |

Screw design 2 increased the extent of mechanical work in the mixing stage compared to screw design 1. Screw design 3 modified screw design 2 by extending the residence time of the polymerizing materials in the advanced polymerization stage.

As indicated, the intrinsic viscosity in Example 4 is substantially lower than the desired, and expected intrinsic viscosity of the polyetherimide. It was determined that the meta-phenylene diamine employed in this Example was badly oxidized prior to the run, but the polymerization was carried out anyway. It is believed that this led to the anomalous results.

Based on the method of preparation, polyetherimides were produced within the scope of formula (3). These polyetherimides consisted essentially of the following chemically combined units

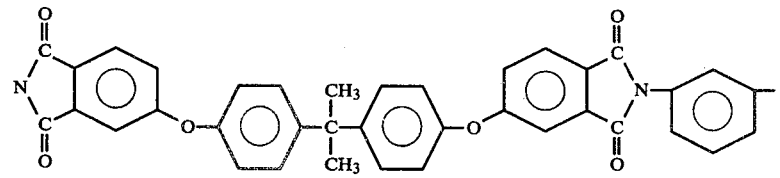

where n is a positive integer greater than 1.

In each of the above runs, steady state conditions were obtained in a very short period of time in each of the stages of the extruder after the initial dianhydride which had been feed to the extruder to precondition the screws and barrel surface was purged from th system by the reaction mixture.

Although the organic dianhydride and organic diamine utilized in the examples were employed in substantially stoichiometric amounts, it has been found that from 0.5 to 2 moles of organic diamine, per mole of the organic dianhydride will provide for satisfactory results. The amount of chain stopper utilized also can vary depending upon the molecular weight or intrinsic viscosity desired in the polyetherimide.

The polymeric material produced in Example 7 was tested and compared to a commercial polyetherimide having the same monomeric materials and employing an aniline end cap. The comparative physical properties are shown below in Table IV, where the tensile yield strength in psi, ultimate strength in psi, elongation in percent, notched Izod in ft.lb./in., and Gardner impact in in.-lbs. are shown:

TABLE IV

| Property | Commercial Polymer | Polymer of Example 7 |
|---|---|---|
| Tensile yield strength (psi) | $14.1 \times 10^3$ | $14.5 \times 10^3$ |
| Ultimate strength (psi) | $15.4 \times 10^3$ | $14.2 \times 10^3$ |
| Elongation (percent) | 98 | 96 |
| Notched Izod (ft.lb./in.) | 0.65 | 0.53 |
| Gardner impact (in.-lbs.) | >320 | >320 |

The properties of the material of Example 7 are considered excellent including, particularly, the outstanding Garnder impact shown.

The extruder to be employed can be any of the extruders generally used for extrusion of plastic materials, but is, preferably, a multi-screw extruder. In that regard, the extruder can have co-rotating screws, and those screws can be tangential or intermeshing. In addition, the extruder can be of the type of device presently marketed under the trade name "Ko-kneader". In fact, though not preferred, the complete extruder as employed in the present invention can be a combination of these types. Obviously, this combination type extruder is not preferred because of the difficulties in assembling and coordinating the various steps.

Although the above examples are directed to only a few of the very many variables which can be used in the practice of the present invention, it should be understood that the present invention is directed to the production of a much broader variety of polyetherimides, based on the use of organic dianhydride of formula (1), organic diamine of formula (2) along with appropriate chain-stopper while the melt polymerization of such monomeric materials can be achieved in an extruder as illustrated in FIG. 1 or FIG. 2.

What we claim as new and desire to secure by Letters Patent of the United States is:

1. A process for the continuous polymerization of polyetherimide which comprises
   (1) dry-blending aromatic bis(ether anhydride) and organic diamine,
   (2) feeding the resulting solids into an extruder,
   (3) conveying the solids to a melting stage in the extruder, where they are kneaded and melted via viscous heating at a temperature in the range of from about 50° C. to about 300° C. resulting in the production of a liquid pool,
   (4) conveying the liquid of (3) to a mass transfer stage where water of reaction is vented to the atmosphere at temperatures of from 200° C. to 350° C.,
   (5) conveying the resulting melt from the mass transfer stage of (4) to an advanced polymerization stage where the melt is further subjected to higher shear and intensive mixing at a temperature in the range of from 300° C. to 400° C. while being subjected to pressures of 1 atmospheres to 25 atmospheres, and
   (6) and thereafter separating from the extruder polyetherimide and additional water of reaction.

2. A process in accordance with claim 1, where the polyetherimide has an intrinsic viscosity in chloroform of at least 0.4.

3. A process in accordance with claim 1, where the polyetherimide consists essentially of chemically combined units of the formula

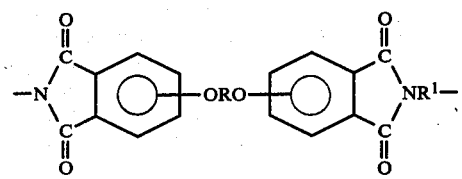

where R is a member selected from

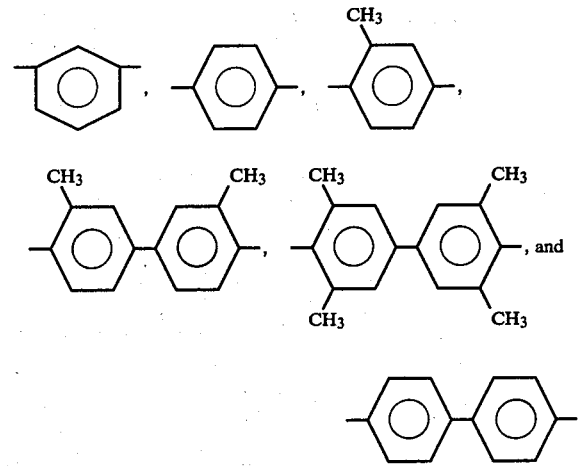

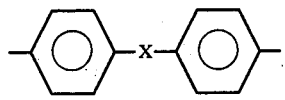

and divalent organic radicals of the general formula,

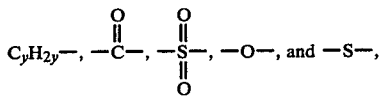

X is a member selected from the class consisting of divalent radicals of the formula, $$C_yH_{2y}-, \ -\overset{O}{\underset{\|}{C}}-, \ -\overset{O}{\underset{\underset{\|}{O}}{\overset{\|}{S}}}-, \ -O-, \text{ and } -S-,$$

y is an integer from 1 to 5; and $R^1$ is a divalent organic radical selected from the class consisting of aromatic hydrocarbon radicals having from 6 to about 20 carbon atoms and halogenated derivatives thereof, alkylene radicals having from 2 to about 20 carbon atoms, cycloalkylene radicals having from 3 to about 20 carbon atoms, from $C_2$ to about $C_8$ alkylene terminated polydiorganosiloxanes and divalent radicals of the general formula,

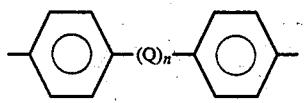

Q is a member selected from the class consisting of

—O—, —S—, $C_xH_{2x}$, x is an integer from 1 to 5 and n is 0 or 1.

4. A method in accordance with claim 1, where the aromatic bis(ether anhydride) has the formula,

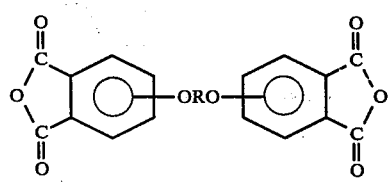

where R is a member selected from

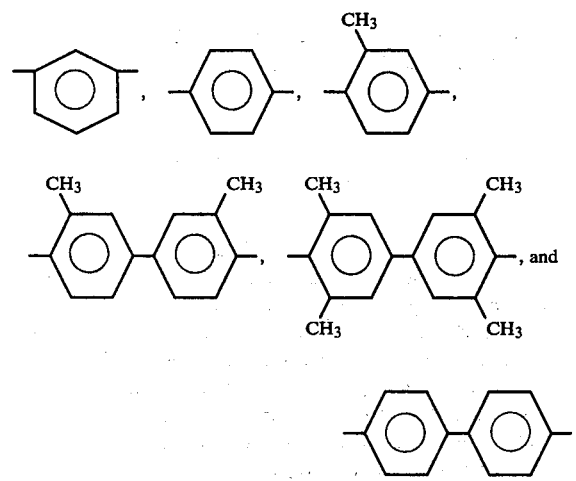

and divalent organic radicals of the general formula,

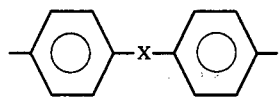

X is a member selected from the class consisting of divalent radicals of the formula,

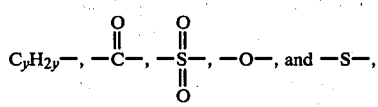

and y is an integer from 1 to 5.

5. A method in accordance with claim 1, where the aromatic bis(ether anhydride) is a mixture of

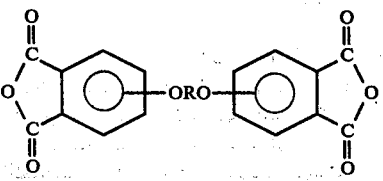

and up to 30 mole percent of benzophenone dianhydride, where R is a member selected from

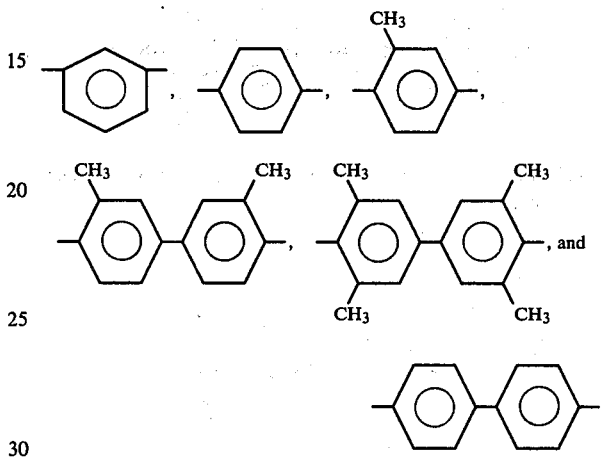

and divalent organic radicals of the general formula,

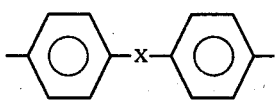

X is a member selected from the class consisting of divalent radicals of the formula,

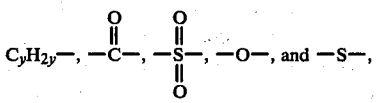

and y is an integer from 1 to 5.

6. A method in accordance with claim 1, where the organic diamine has the formula, $H_2N—R^1—NH_2$, where $R^1$ is a divalent organic radical selected from the class consisting of aromtic hydrocarbon radicals haviang from 6 to about 20 carbon atoms and halogenated derivatives thereof, alkylene radicals having from 2 to about 20 carbon atoms, cycloalkylene radicals having from 3 to about 20 carbon atoms, from $C_2$ to about $C_8$ alkylene terminated polydiorganosiloxanes and divalent radicals of the general formula,

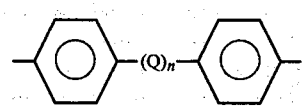

Q is a member selected from the class consisting of

—O—, —S—, $C_xH_{2x}$, x is an integer from 1 to 5 and n is 0 or 1.

7. A method in accordance with claim 1, where there is utilized an effective amount of a chain stopper.

8. A process for the continuous, steady state polymerization of polyetherimides consisting essentially of chemically combined units of the formula,

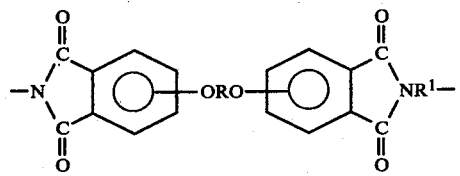

(1) dry-blending aromatic bis(ether anhydride) of the formula,

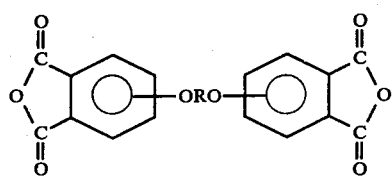

and the organic diamine has the formula,

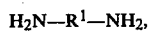

$H_2N—R^1—NH_2$, (2) continuously introducing the dry-blended solids of (1) to an extruder,
(3) continuously conveying the blended solids to a melting stage in the extruder, where they are rapidly converted to a liquid as a result of being subjected to kneading conditions at a temperature in the range of from about 50° C. to about 300° C.,
(4) continuously conveying the liquid of (3) to a first extruder mass transfer stage to effect separation of water of reaction resulting in polyetherimide formation based on the intercondensation of the aromatic bis(ether anhydride) and organic diamine,
(5) continuously conveying the viscous polyetherimide product of reaction from the first mass transfer stage of (4) to a mixing stage where the intercondensation product of reaction is subjected to high shear at a temperature in the range of from about 250° C. to 350° C. and elevated pressures to further polymerize the polyetherimide,
(6) conveying said further polymerized polyetherimide to a second mass transfer stage where further melt pool acceleration, polymerization, and evacuation of water of reaction are accomplished,
(7) conveying said further polymerized polyetherimide from said second mass transfer stage to an advanced polymerization stage where complete polymerization of said polyetherimide is accomplished with extended residence time, and
(8) removing a high polymer polyetherimide from said advanced polymerization stage with removal of final water of reaction, where R is a member selected from

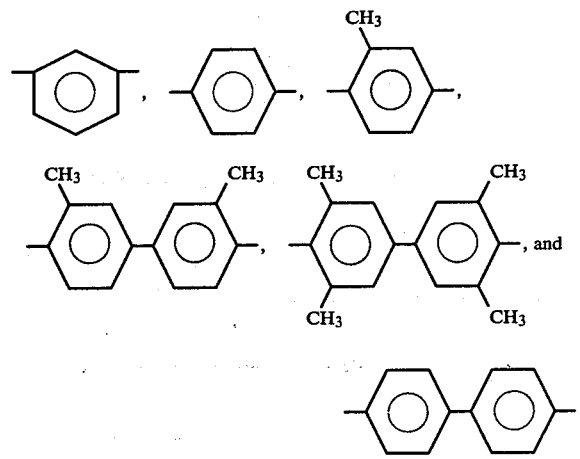

and divalent organic radicals of the general formula,

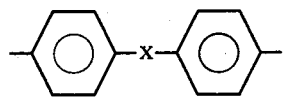

X is a member selected from the class consisting of divalent radicals of the formula,

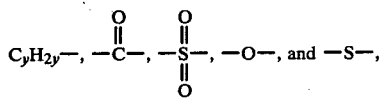

y is an integer from 1 to 5; and $R^1$ is a divalent organic radical selected from the class consisting of aromatic hydrocarbon radicals having from 6 to about 20 carbon atoms and halogenated derivatives thereof, alkylene radicals having from 2 to about 20 carbon atoms, cycloalkylene radicals having from 3 to about 20 carbon atoms, from $C_2$ to about $C_8$ alkylene terminated polydiorganosiloxanes and divalent radicals of the general formula,

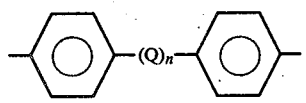

Q is a member selected from the class consisting of

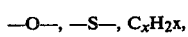

—O—, —S—, $C_xH_{2x}$, x is an integer from 1 to 5 and n is 0 or 1.

9. The process of claim 7 wherein from 40 to 60% of the water of reaction is removed in said first mass transfer stage, from 30 to 45% of said water of reaction is removed in said second mass transfer stage, and from 10 to 15% of said water of reaction is removed upon removal of the high polymer from said advanced polymerization stage.

10. The process of claim 7 wherein the elements in said melting stage of said extruder are kneading blocks and zero pumping blocks.

11. The process of claim 9 wherein the solids in said melting stage are raised to a temperature of from 50° to 100° C., melting of said solids is accomplished at from 200° to 300° C., and the liquid temperature is maintained at from 180° to 300° C., at a pressure of 1 to 5 atmospheres.

12. The process of claim 10 wherein the liquid temperature is maintained at from 225° to 275° C. and the pressure is maintained at from 1 to 2 atmospheres.

13. The process of claim 7 wherein the elements in said first mass transfer stage are open pitch, forward conveying elements.

14. The process of claim 13 wherein the temperature in said first mass transfer stage is maintained at from 180° to 400° C. at atmospheric pressure.

15. The process of claim 14 wherein the temperature is maintained at from 200° to 350° C.

16. The process of claim 8 wherein the elements in said mixing stage are zero and forward conveying kneadiang blocks.

17. The process of claim 16 wherein the temperature in said mixing stage is maintained at from 200° to 400° C. and the pressure is maintained at from 1 to 6 atmospheres.

18. The process of claim 17 wherein the temperature is maintained at from 200° to 350° C. and the pressure is maintained at from 1 to 3 atmospheres.

19. The process of claim 8 wherein the elements in said second mass transfer stage of said extruder are medium pitch, forward conveying elements.

20. The process of claim 19 wherein the temperature in said second mass transfer stage is maintained at from 250° to 400° C. and the pressure is essentially atmospheric.

21. The process of claim 20 wherein the temperature is frotm 300° to 350° C. and the pressure is maintained at from 1 to 6 atmospheres.

22. The process of claim 8 wherein the elements in said advanced polymerization stage of said extruder are tight pitch, forward conveying elements and said stage is provided with a restricted exit.

23. The process of claim 22 wherein the temperature in said advanced polymerization stage is maintained at from 300° to 400° C. and the pressure is maintained at from 1 to 50 atmospheres.

24. The process of claim 23 wherein the temperature is from 325° to 400° C. and the pressure is from 1 to 25 atmospheres.

25. The process of claim 1 wherein said extruder has two screws, said screws being co-rotating and intermeshing.

* * * * *